United States Patent Office 3,338,896
Patented Aug. 29, 1967

3,338,896
7-(SUBSTITUTED PROPIONAMIDO) CEPH-
ALOSPORANIC ACID AND DERIVA-
TIVES THEREOF
Tadayoshi Takano, Hirakata, and Kiyoshi Hattori, Ibaragi,
Japan, assignors to Fujisawa Pharmaceutical Co., Ltd.,
Osaka, Japan, a company of Japan
No Drawing. Filed Mar. 10, 1965, Ser. No. 438,744
5 Claims. (Cl. 260—243)

This invention relates to 7-(substituted propionamido) cephalosporanic acid and derivatives thereof.

An object of this invention is to provide new compounds which are useful as the antimicrobial agents.

The compounds of this invention may be represented by following structural Formula I:

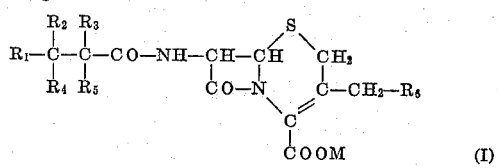

(I)

wherein $R_1$ is aryl, arylcarbonyl, five membered heterocyclic, aryl having halogen or nitro, or arylcarbonyl having halogen or nitro; $R_2$ and $R_3$ is hydrogen, halogen or aryl, one of $R_4$ and $R_5$ is halogen and the other is hydrogen, halogen or lower alkoxy; $R_6$ is acetoxy, pyridinium, aminopyridinium, imidazolinium or methylimidazolinium; M is hydrogen, a pharmaceutically acceptable non-toxic cation or an anionic charge.

In the above formula, five membered heterocyclic of $R_1$ includes thienyl, furyl, pyrrolyl, etc., aryl of $R_1$ includes phenyl, naphthyl, tolyl, etc. and further, a pharmaceutically acceptable non-toxic cation of M includes, for example, the alkali metal ion such as sodium ion or potassium ion, the ammonium radical and the organic ammonium cation such as triethyl ammonium, dicyclohexyl ammonium, diphenylenediammonium or dibenzylethylenediammonium.

The compound (I) of this invention may be prepared by reacting 7-aminocephalosporanic acid or its derivatives having the Formula II:

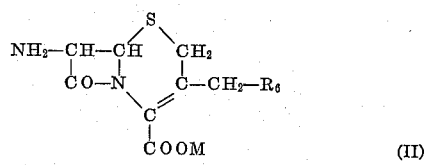

(II)

with substituted propionic acid having the Formula III:

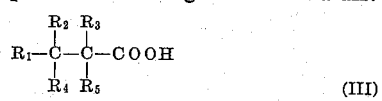

(III)

or its reactive derivative, wherein $R_{1-6}$ and M are the same as those described in Formula I.

7-aminocephalosporanic acid (7-amino-3-acetoxylmethyl-3-cephem-4-carboxylic acid) in the starting material (II) is known compound in the art and can be obtained upon hydrolysis of antibiotic cephalosporin C [Biochemical Journal 79, 408–416 (1961)].

When using substituted propionic acid, the reaction is preferably carried out in the presence of the condensing agent such as dicyclohexylcarbodiimide, N-cyclohexyl-N-morpholinoethyl-carbodiimide, pentamethyleneketen-N-cyclohexylimine, N-ethyl-o-phenylisoxazolium - 3′ - sulfonate, phosphorus trichloride and so forth. In this case, it is considered that the reaction may mainly proceed through an active form of carboxyl radical in substituted propionic acid or of amino radical in 7-aminocephalosporanic acid.

In reactive derivatives of substituted propionic acid may be mentioned the acid halide, acid anhydride, acid amide, acid ester and so forth. Examples of the reactive derivatives of substituted propionic acid to be frequently used are the acid chloride, acid azide, mixed acid anhydride with alkylphosphoric acid or alkylcarbonic acid, acid amide with imidazole or 4-substituted imidazole, acid cyanomethyl ester, acid p-nitrophenyl ester and so forth. These reactive derivatives are suitably selected in accordance with the kinds of substituted propionic acid to be used.

The reaction is usually carried out in the presence of a solvent. In the solvent may be mentioned acetone, dioxane, acetonitril, chloroform, ethylene chloride, tetrahydrofuran, or other organic solvents which are inert in the reaction and are used commonly. Of these solvents, the hydrophylic ones may be used with water.

Also, the reaction may be carried out in the presence of a base such as alkali metal hydrogen carbonate, trialkylamine, pyridine, etc. The reaction is carried out in most cases under cooling or at room temperature though the temperature is not particularly limited.

After completing the reaction, the reaction product is separated according to the conventional method known in the arts.

When using the compound (II) wherein M is a pharmaceutically acceptable non-toxic cation as a starting compound, the object compound (I) wherein M is hydrogen is mainly obtained, because the dissociation of the cation tends to occur during the separation of the reaction product. Therefore, if it is desired to obtain the object compound (I) wherein M is a pharmaceutically acceptable non-toxic cation, the compound (I) wherein M is hydrogen is treated with an appropriate compound such as sodium hydroxide, potassium hydroxide, sodium α-ethylhexanoate, triethylamine, dicyclohexylamine or diphenylenediamine.

In addition, the compound (I) wherein $R_6$ is pyridinium, aminopyridinium, imidazolinium or methylimidazolinium may be obtained by reacting the compound (II) wherein $R_6$ is acetoxy, with pyridine, aminopyridine, imidazole or methylimidazole.

Both 7-aminocephalosporanic acid or its derivatives to be used in the reaction of this invention and the object compound (I) are comparatively unstable and tend to decompose during treatment. Therefore, it is preferable to carry out the reaction and separation under mild condition.

Thus obtained compound (I) not only demonstrates resistance to penicillinase but exhibits advantageous physiological properties and activity against a wide variety of micro-organisms.

The followng examples will illustrate the types of compounds available in accordance with this invention.

In the examples, "MIC" means a minimum inhibitory concentration which is measured by the serial dilution method commonly employed in testing antimicrobial compound, and *Escherichia coli* and *Staphylococcus aureus* are referred to "*E. coli*" and "*St. aureus*," respectively.

EXAMPLE 1

7-(2,3-dichloro-3-phenylpropionamido) cephalosporanic acid

To the solution of 540 mg. of 7-aminocephalosporanic acid and 200 mg. of sodium bicarbonate in 30 cc. of aqueous acetone (60%), was added 500 mg. of 2,3-dichloro-2-phenylpropionyl chloride in 5 cc. of acetone under ice-cooling, stirred for 3 hours under ice-cooling and allowed to stand overnight. The reaction mixture was condensed under reduced pressure, the remaining solution was adjusted to pH 3.0 with sulfuric acid and precipitated crystals were collected by filtration. Thus obtained crystals were extracted with ether and the solvent was distilled off under reduced pressure. The remainder was digested with benzene, after which the saturated solution was condensed under reduced pressure to which was added chloroform and allowed to stand in an ice-box to obtain 265 mg. of 7-(2,3-dichloro-3-phenylpropionamido) cephalosporanic acid as crystals having M.P. 157°–159° C.

VU: $\lambda_{max.}^{80\% \; C_2H_5OH}$ 263 m$\mu$, E 162.
PPC: Rf 0.86 (butanol:ethanol:water=4:1:5 by upper layer, ascending method).
Rf 0.85 (butanol:pyridine:water=1:1:1 by ascending method).
MIC: E. coli >40 $\gamma$/cc., St. aureus 0.4 $\gamma$/cc.

EXAMPLE 2

7-(2,3-dibromo-3-phenylpropionamido) cephalosporanic acid

To the solution of 680 mg. of 7-aminocephalosporanic acid and 0.8 cc. of triethylamine in 25 cc. of chloroform, was added 820 mg. of 2,3-dibromo-3-phenylpropionyl chloride in chloroform under ice-cooling and after stirring for 3 hours, allowed to stand overnight. To the reaction mixture was added water and adjusted to pH 2.0 with hydrochloric acid, after which the chloroform layer was separated out. The chloroform layer was condensed under reduced pressure, and then the remainder was washed with ether and extracted with acetone. To the extract solution was added ether to obtain 960 mg. of 7-(2,3-dibromo-3-phenylpropionamido) cephalosporanic acid as powders having M.P. 84–87° C. (dec.).

UV: $\lambda_{max.}^{80\% \; C_2H_5OH \cdot NaOH}$ 277 m$\mu$, E 388.
PPC: Rf 0.80 (butanol:ethanol:water=4:1:5 by upper layer, ascending method).
Rf 0.97 (butanol:pyridine:water=1:1:1 by ascending method).
MIC: E. coli > 40 $\gamma$/cc., St. aureus 2.5 $\gamma$/cc.

EXAMPLE 3

7-(2,3-dichloro-3-thienylpropionamido) cephalosporanic acid

To the solution of 600 mg. of 7-aminocephalosporanic acid in 0.7 cc. of triethylamine, 0.2 cc. of pyridine and 25 cc. of chloroform, was added 600 mg. of 2,3-dichloro-3-thienylpropionyl chloride under ice-cooling, stirred for 2 hours under ice-cooling and allowed to stand overnight at room temperature. After adding dil. sulfuric acid to the reaction mixture, the chloroform layer was separated out from which chloroform was distilled off under reduced pressure and then the remainder was washed with ether and extracted with acetone. To the extract solution was added ethanol and allowed to stand overnight in an ice-box to obtain 7-(2,3-dichloro-3-thienylpropionamido) cephalosporanic acid as powders having M.P. 121°–124° C. (dec.).

MIC: E. coli >40 $\gamma$/cc., St. aureus 5.0 $\gamma$/cc.

EXAMPLE 4

7-[2,3-dichloro-3-(p-chlorophenyl) propionamido] cephalosporanic acid

To the solution of 820 mg. of 7-aminocephalosporanic acid in 1.2 cc. of triethylamine and 45 cc. of chloroform was added drop by drop 900 mg. of 2,3-dichloro-3-(p-chlorophenyl) propionyl chloride in 5 cc. of chloroform under ice-cooling and stirred for an hour. The reaction mixture was shaken together with water adjusted to pH 1.0 and the chloroform layer was condensed under reduced pressure. The remainder was extracted with benzene, which was distilled off. Thus obtained remainder was washed with ether and then reprecipitated from the mixture of acetone and ether to obtain 640 mg. of 7-[2,3-dichloro-3-(p-chlorophenyl) propionamido] cephalosporanic acid as powders M.P. 109–112° C. (dec.).

UV: $\lambda_{max.}^{80\% \; C_2H_5OH}$ 282 m$\mu$, E 382.
MIC: E. coli >40 $\gamma$/cc., St. aureus 1.25 $\gamma$/cc.

EXAMPLE 5

7-(2-chloro-3-phenylpropionamido) cephalosporanic acid

To the solution of 680 mg. of 7-aminocephalosporanic acid in 16 cc. of 3% aqueous sodium bicarbonate solution and 15 cc. of acetone, was added drop by drop 508 mg. of 2-chloro-3-phenylpropionyl chloride in 15 cc. of acetone for 15 minutes and after stirring for 30 minutes at 0–5° C., allowed to stand for one day. The reaction mixture was washed with ether and the water layer was adjusted to pH 2.0 with 5% hydrochloric acid and extracted with ethyl acetate. The extract solution was condensed under reduced pressure and the remainder was reprecipitated from the mixture of ether and petroleum ether to obtain 170 mg. of 7-(2-chloro-3-phenylpropionamido) cephalosporanic acid as powders having M.P. 141–143° C. (dec.).

UV: $\lambda_{inf.}^{80\% \; C_2H_5OH \cdot NaOH}$ 260 m$\mu$, E 183.
MIC: E. coli >20 $\gamma$/cc., St. aureus 0.5 $\gamma$/cc.

EXAMPLE 6

7-[2,3-dichloro-3-(p-nitrophenyl) propionamido] cephalosporanic acid

To the solution of 810 mg. of 7-aminocephalosporanic acid and 400 mg. of sodium bicarbonate in 40 cc. of 50% aqueous acetone, was added 1.4 g. of 2,3-dichloro-3-(p-nitrophenyl) propionyl chloride in 7 cc. of acetone under ice-cooling and stirred for 2 hours under ice-cooling and then for 4 hours at room temperature, after which was allowed to stand overnight in an ice-box. The reaction mixture was adjusted to pH 2.0 with sulfuric acid and condensed under reduced pressure. The produced precipitate was collected by filtration, washed with ether and dissolved into acetone. To this acetone solution was added ether and allowed to stand in an ice-box to obtain 406 mg. of 7 - [2,3 - dichloro - 3-(p-nitrophenyl) propionamide] cephalosporanic acid as powders having M.P. 157–160° C. (dec.).

MIC: E. coli >40 $\gamma$/cc., St. aureus 10 $\gamma$/cc.

EXAMPLE 7

7-(3-chloro-3-phenylpropionamido) cephalosporanic acid

To the solution of 816 mg. of 7-aminocephalosporanic acid in 1 cc. of triethylamine and 30 cc. of chloroform, was added 609 mg. of 3-chloro-3-phenylpropionyl chloride in chloroform under ice-cooling and after stirring for 4 hours under ice-cooling, allowed to stand overnight in a cold place. The reaction mixture was adjusted to pH 2.0 with hydrochloric acid and the chloroform layer was separated and distilled under reduced pressure. The remainder was washed with ether to obtain 535 mg. of 7-(3-chloro-3-phenylpropionamido) cephalosporanic acid as powders having M.P. 119–122° C. (dec.).

UV: $\lambda_{max.}^{80\% \; C_2H_5OH}$ 272 m$\mu$, E 328.
MIC: E. coli >40 $\gamma$/cc., St. aureus 2.5 $\gamma$/cc.

EXAMPLE 8

7-(2,3,3-trichloro-3-phenylpropionamido) cephalosporanic acid

To the solution of 640 mg. of 2,3,3-trichloro-3-phenylpropionic acid in 2.5 cc. of dicyclohexylcarbodiimide solution and 1.5 cc. of tetrahydrofuran, was added 680 mg. of 7-aminocephalosporanic acid and 220 mg. of sodium bicarbonate in 10 cc. of tetrahydrofuran and 5 cc. of water, and after being stirred for 4 hours at room temperature, allowed to stand for one day. The reaction mixture was filtered and the filtrate was adjusted to pH 7.5 with sodium bicarbonate, after which tetrahydrofuran was distilled off under reduced pressure. The remainder was further adjusted to pH 1.0 with hydrochloric acid and extracted with ethyl acetate, which was distilled off under reduced pressure. Thus obtained remainder was washed with ether to obtain 145 mg. of 7-(2,3,3-trichloro-3-phenylpropionamido) cephalosporanic acid as powders having M.P. 125–130° C. (dec.).

UV: $\lambda_{max.}^{80\% \ C_2H_5OH}$ 260 m$\mu$, E 257.

EXAMPLE 9

7-(2-bromo-3-phenylpropionamido) cephalosporanic acid

To the solution of 540 mg. of 7-aminocephalosporanic acid in 0.8 cc. of triethylamine and 25 cc. of chloroform, was added drop by drop 335.2 mg. of 2-bromo-3-phenylpropionyl chloride in 5 cc. of chloroform under ice-cooling while stirring, after which was further stirred for an hour under cooling and then allowed to stand overnight. To the reaction mixture was added water, acidified and filtered. Thus obtained precipitate was dissolved into acetone and condensed under reduced pressure. The condensed solution was washed with ether to obtain 51.0 mg. of 7-(2-bromo-3-phenylpropionamido) cephalosporanic acid as powders having M.P. 105–107° C. (dec.). From the filtrate obtained by filtration of the reaction mixture as above mentioned, the chloroform layer was separated out and the solvent was distilled off under reduced pressure. The remainder was washed with ether to obtain, too, 53.2 mg. of 7-(2-bromo-3-phenylpropionamido) cephalosporanic acid as powders having M.P. 105–107° C. (dec.). The total yield was 104.2 mg.

UV: $\lambda_{max.}^{80\% \ C_2H_5OH \cdot NaOH}$ 267.5 m$\mu$, E 191.

MIC: *E. coli* >40 $\gamma$/cc., *St. aureus* 0.5 $\gamma$/cc.

EXAMPLE 10

7-(2-chloro-3-methoxy-3-phenylpropionamido) cephalosporanic acid

To the solution of 490 mg. of 2-chloro-3-methoxy-3-phenylpropionic acid in 0.4 cc. of triethylamine, 0.23 cc. of ethylchlorocarbonate and 20 cc. of acetone, was added 680 mg. of 7-aminocephalosporanic acid and 230 mg. of sodium bicarbonate in 170 cc. of water under ice-cooling and stirred for 30 minutes at 0–5° C. and then for 1.5 hours at room temperature. The reaction mixture was washed with ether and, after adjusting to pH 2.0, the water layer was extracted with ethylacetate. From the extract solution, solvent was distilled off under reduced pressure. Thus obtained remainder was washed with ether and then reprecipitated from the mixture of acetone and ether to obtain 80 mg. of 7-(2-chloro-3-methoxy-3-phenylpropionamido) cephalosporanic acid as powders having M.P. 157–159° C. (dec.).

UV: $\lambda_{max.}^{80\% \ C_2H_5OH \cdot NaOH}$ 274 m$\mu$, E 320.

MIC: *E. coli* >40 $\gamma$/cc., *St. aureus* 2.0 $\gamma$/cc.

EXAMPLE 11

7-[2-chloro-3-methoxy-3-(p-chlorophenyl) propionamido] cephalosporanic acid

To the solution of 720 mg. of 7-aminocephalosporanic acid in 1.4 cc. of triethylamine and 30 cc. of chloroform, was added 810 mg. of 2-chloro-3-methoxy-3-(p-chlorophenyl) propionyl chloride in 6 cc. of chloroform and stirred for 2 hours under ice-cooling and then for 4 hours at room temperature. To this reaction mixture was added 210 mg. of dicyclohexylcarbodiimide and after being allowed to stand overnight, condensed under reduced pressure. The condensed solution was filtered and the filtrate, after adjusting to pH 2.8–3.0 with hydrochloric acid, was extracted with ethyl acetate, which was distilled off under reduced pressure. The remainder was washed with ether and reprecipitated from acetone to obtain 95 mg. of 7-[2-chloro-3-methoxy-3-(p-chlorophenyl) propionamido] cephalosporanic acid as powders having M.P. 120–123° C. (dec.).

UV: $\lambda_{max.}^{80\% \ C_2H_5OH}$ 262 m$\mu$, E 154.

MIC: *E. coli* >40 $\gamma$/cc., *St. aureus* 2.5 $\gamma$/cc.

EXAMPLE 12

7-(2-chloro-3-benzoylpropionamido) cephalosporanic acid 2-chloro-3-benzoylpropionic acid (390 mg.) was dissolved into 1.8 cc. of tetrahydrofuran solution of dicyclohexylcarbodiimide (0.2 g./cc.) and 20 cc. of tetrahydrofuran and stirred at room temperature. To this solution was added drop by drop 500 mg. of 7-aminocephalosporanic acid and 170 mg. of sodium bicarbonate in 10 cc. of tetrahydrofuran and 10 cc. of water and stirred for 13 hours at room temperature. The reaction mixture was filtered and from the filtrate, tetrahydrofuran was distilled off under reduced pressure. The remaining solution was filtered and after adjusting to pH 1.0 with hydrochloric acid, the filtrate was extracted with ethyl acetate. The extract solution was condensed under reduced pressure and washed with the mixture of ether and petroleum ether to obtain 100 mg. of 7-(2-chloro-3-benzoylpropionamido) cephalosporanic acid as powders having M.P. 89–93° C. (dec.).

UV: $\lambda_{max.}^{80\% \ C_2H_5OH \cdot NaOH}$ 246 m$\mu$, E 316.

MIC: *E. coli* >40 $\gamma$/cc., *St. aureus* 5 $\gamma$/cc.

EXAMPLE 13

7-(2,3-dichloro-3-benzoylpropionamido) cephalosporanic acid

To 445 mg. of 2,3-dichloro-3-benzoylpropionic acid dissolved into 10 cc. of tetrahydrofuran was added 2 cc. of tetrahydrofuran solution containing 400 mg. of dicyclohexylcarbodiimide and stirred for 15 minutes. To this solution was added drop by drop the aqueous solution containing 500 mg. of 7-aminocephalosporanic acid and 150 mg. of sodium bicarbonate in a minute and after stirring for 2 hours at room temperature, allowed to stand overnight. The reaction mixture was filtered and from the filtrate, tetrahydrofuran was distilled off under reduced pressure. The remainder from which an oily substance was removed by decantation, was adjusted to pH 1.0 with 5% hydrochloric acid and extracted with 100 cc. of ethyl acetate, which was distilled off from the extract solution under reduced pressure. Thus obtained remainder was dissolved into acetone and filtered, after which acetone was distilled off. The remainder was washed with petroleum ether to obtain 391 mg. of 7-(2,3-dichloro-3-benzoylpropionamido) cephalosporanic acid as faint yellow powders having M.P. 66–72° C. (dec.).

UV: $\lambda_{max.}^{80\% \ C_2H_5 \cdot NaOH}$ 260 m$\mu$, E 307.

MIC: *E. coli* >40 $\gamma$/cc., *St. aureus* 2 $\gamma$/cc.

EXAMPLE 14

7-[2,3-dichloro-3-(o-nitrobenzoyl) propionamido] cephalosporanic acid 2,3-dichloro-3-(o-nitrobenzoyl) propionic acid (610 mg.) was dissolved into 2 cc. of tetrahydrofuran solution of dicyclohexylcarbodiimide (2.15 g./10 cc.) and 20 cc. of tetrahydrofuran and stirred at room temperature. To this solution was added drop by drop 540 mg. of 7-aminocephalosporanic acid and 180 mg. of sodium bicarbonate in 15 cc. of water and 5 cc. of tetrahydrofuran and after stirring for 6 hours at room temperature, allowed to stand for 2 days. The reaction mixture was filtered and from the filtrate, tetrahydrofuran was distilled off under reduced pressure. The remaining solution was adjusted to pH 8.0 with sodium bicarbonate and filtered. Thus obtained filtrate was adjusted to pH 1.0 with hydrochloric acid and extracted with ethyl acetate, which was distilled off from the extract solution under reduced pressure. The remainder was washed with ether to obtain 15 mg. of 7-[2,3-dichloro-3-(o-nitrobenzoyl propionamido] cephalosporanic acid as powders having M.P. 95–118° C. (dec.).

UV: $\lambda_{max.}^{80\% \ C_2H_5OH \cdot NaOH}$ 262 m$\mu$, E 273.
MIC: $E.\ coli$ >40 $\gamma$/cc., $St.\ aureus$ 20 $\gamma$/cc.

EXAMPLE 15

*7-(2,3-dichloro-3-phenylpropionamido)-3-pyridinium-methyl-decephalosporanic acid inner salt*

The acetone solution of 7-amino-3-pyridiniummethyl-decephalosporanic inner salt and 2,3-dichloric-3-phenyl-propionyl chloride was allowed to react in the presence of sodium bicarbonate. The reaction mixture was adjusted to pH 5.5–6.5 and treated with ether. The water layer was refined through the column packed with anion exchange resin (Dowex–1). The elute containing the object compound was submitted to freeze drying to obtain 7-(2,3-dichloro-3-phenylpropionamido) - 3 - pyridiniummethyl-decephalosporanic acid inner salt as solid having M.P. 165–170° C.

UV: $\lambda_{max.}^{80\% \ C_2H_5OH \cdot NaOH}$ 274 m$\mu$, E 191.
MIC: $E.\ coli$ >40 $\gamma$/cc., $St.\ aureus$ 0.25 $\gamma$/cc.

EXAMPLE 16

*7-[2,3-dichloro-3-(p-chlorophenyl) propionamido]-3-pyridiniummethyl-decephalosporanic acid inner salt*

7-amino-3-pyridiniummethyl-decephalosporanic acid inner salt and 2,3-dichloro-3-(p-chlorophenyl) propionic acid in 50% acetone were treated in the same way as Example 15 to obtain 7-[2,3-dichloro-3-(p-chlorophenyl) propionamido] - 3 - pyridiniummethyl-decephalosporanic acid inner salt as solid having M.P. 165–170° C. (dec.).

UV: $\lambda_{max.}^{80\% \ C_2H_5OH \cdot NaOH}$ 274 m$\mu$, E 191.
MIC: $E.\ coli$ >40 $\gamma$/cc., $St.\ aureus$ 0.25 $\gamma$/cc.

EXAMPLE 17

*Dicyclohexylamine salt of 7-(2,3-dichloro-3-phenyl-propionamido) cephalosporanic acid*

To 7-(2,3-dichloro-3-phenylpropionamido) cephalosporanic acid was added drop by drop dicyclohexylamine in acetone and allowed to stand overnight in a cold place to obtain the salt of 7-(2,3-dichloro-3-phenylpropionamido) cephalosporanic acid with dicyclohexylamine having M.P. 153–155° C. (dec.).

UV: $\lambda_{max.}^{95\% \ C_2H_5OH}$ 265 m$\mu$, E 145.

EXAMPLE 18

*Sodium salt of 7-(2,3-dichloro-3-phenylpropionamido) cephalosporanic acid*

The substance obtained in Example 1 and sodium bicarbonate were treated in the same way as described in Example 17 to obtain sodium salt of 7-(2,3-dichloro-3-phenylpropionamide) cephalosporanic acid.

UV: $\lambda_{max.}^{95\% \ C_2H_5OH}$ 265.5 m$\mu$, E 206.

We claim:
1. A compound having the general formula:

$$\begin{array}{c} R_2 \ R_3 \\ | \ | \\ R_1-C-C-CONH-CH-CH \\ | \ | \quad\quad\quad | \\ R_4 \ R_5 \quad\quad CO-N \end{array} \begin{array}{c} S \\ \diagdown \\ CH_2 \\ | \\ C-CH_2 \cdot R_6 \\ \| \\ C \\ | \\ COOM \end{array}$$

wherein $R_1$ is a phenyl, nitrophenyl, halophenyl, benzoyl, nitrobenzoyl or thienyl; $R_2$ and $R_3$ are hydrogen or halogen; $R_4$ and $R_5$ are halogen; $R_6$ is acetoxy, pyridinium, aminopyridinium, imidazolinium or methylimidazolinium; M is hydrogen, an alkali metal, cyclohexylammonium or an anionic charge.

2. 7-(2,3-dichloro - 3 - phenylpropionamido) cephalosporanic acid or the sodium or dicyclohexyl amine salt thereof.

3. 7-(2,3-dichloro - 3 - thienylpropionamido) cephalosporanic acid.

4. 7-[2,3-dichloro-3-(p-chlorophenyl) propionamido] cephalosporanic acid.

5. Inner salt of 7-(2,3-dichloro-3-phenylpropionamido)-3-pyridiniummethyl-decephalosporanic acid or 7-[2,3 - dichloro - 3 - (p - chlorophenyl) propionamido]-3-pyridiniummethyl-decephalosporanic acid.

References Cited
UNITED STATES PATENTS 3,225,038  12/1965  Flynn _____ 260—243
3,236,841  2/1966  Kuehl et al. _____ 260—243

NICHOLAS S. RIZZO, *Primary Examiner.*